United States Patent
Rein

(10) Patent No.: US 10,206,264 B2
(45) Date of Patent: Feb. 12, 2019

(54) SMART LIGHTING SYSTEM

(71) Applicant: Vivint, Inc., Provo, UT (US)

(72) Inventor: Harry Rein, Hingham, MA (US)

(73) Assignee: Vivint, Inc., Provo, UT (US)

( * ) Notice: Subject to any disclaimer, the term of this patent is extended or adjusted under 35 U.S.C. 154(b) by 146 days.

(21) Appl. No.: 14/522,498

(22) Filed: Oct. 23, 2014

(65) Prior Publication Data

US 2016/0120007 A1 Apr. 28, 2016

(51) Int. Cl.
*H05B 37/02* (2006.01)

(52) U.S. Cl.
CPC ..... *H05B 37/0227* (2013.01); *H05B 37/0281* (2013.01); *Y02B 20/42* (2013.01); *Y02B 20/445* (2013.01); *Y02B 20/48* (2013.01)

(58) Field of Classification Search
CPC ............ H05B 37/0227; H05B 37/0272; H05B 37/02; H05B 33/0854; H05B 37/0281; H05B 37/0218; H05B 33/0872; Y02B 20/44; Y02B 20/42; Y02B 20/40; Y02B 20/48; Y02B 20/445; F21V 23/0442; F21V 23/0471; G08B 25/008; G08B 5/36; H04N 5/44; G01C 21/206
USPC ........ 315/158, 291, 307, 294, 153; 250/205; 362/276
See application file for complete search history.

(56) References Cited

U.S. PATENT DOCUMENTS

| | | | | |
|---|---|---|---|---|
| 5,101,191 A | * | 3/1992 | MacFadyen | ....... G08B 13/1418 307/22 |
| 8,538,596 B2 | | 9/2013 | Gu et al. | |
| 9,019,111 B1 | * | 4/2015 | Sloo | .......... F24F 11/30 340/628 |
| 9,655,217 B2 | * | 5/2017 | Recker | ............... H05B 37/0272 |
| 9,955,551 B2 | * | 4/2018 | Spero | ....................... B60Q 1/04 |
| 9,983,011 B2 | * | 5/2018 | Mountain | ............ G01C 21/206 |
| 2004/0257237 A1 | * | 12/2004 | Bialecki, Jr. | ........... G08B 21/22 340/686.1 |
| 2008/0079568 A1 | | 4/2008 | Primous et al. | |
| 2010/0277333 A1 | | 11/2010 | Van De Sluis et al. | |
| 2011/0133655 A1 | * | 6/2011 | Recker | ...................... H02J 9/02 315/159 |
| 2012/0068611 A1 | | 3/2012 | Steiner et al. | |
| 2012/0153868 A1 | * | 6/2012 | Gu | ..................... H05B 37/0227 315/307 |
| 2012/0296487 A1 | | 11/2012 | Leinen et al. | |

(Continued)

FOREIGN PATENT DOCUMENTS

WO 2006038853 A1 4/2006
WO 2012093323 A1 7/2012

OTHER PUBLICATIONS

PCT International Search Report for International Application No. PCT/US2015/056927, dated Feb. 3, 2016 (3 pp.).

*Primary Examiner* — Haissa Philogene
(74) *Attorney, Agent, or Firm* — Holland & Hart, LLP

(57) ABSTRACT

According to at least one embodiment, a computer-implemented method to illuminate a room is described. At least one person entering the room may be identified. The room may be illuminated based at least in part on the identifying. An occupancy count for the room may be maintained based at least in part on the illuminating, wherein the occupancy count comprises a number of one or more people present in the room. The room may be darkened based at least in part on the occupancy count for the room reaching a predetermined count.

20 Claims, 6 Drawing Sheets

(56) References Cited

U.S. PATENT DOCUMENTS

| | | |
|---|---|---|
| 2012/0300011 A1 | 11/2012 | Moletti et al. |
| 2013/0147367 A1* | 6/2013 | Cowburn ............ H05B 37/0254 |
| | | 315/152 |
| 2014/0163703 A1 | 6/2014 | Chang et al. |
| 2014/0191666 A1 | 7/2014 | Vissenberg et al. |
| 2014/0266669 A1* | 9/2014 | Fadell ................... G05B 19/042 |
| | | 340/501 |
| 2015/0035432 A1* | 2/2015 | Kendall ................ F25D 27/005 |
| | | 315/76 |
| 2015/0035440 A1* | 2/2015 | Spero ....................... B60Q 1/04 |
| | | 315/153 |

* cited by examiner

SMART LIGHTING SYSTEM

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Home automation and security products can help manage busy lives by managing illumination in a building.

SUMMARY

According to at least one embodiment, a computer-implemented method to illuminate a room is disclosed. At least one person entering the room may be identified. The room may be illuminated based at least in part on the identifying. An occupancy count for the room may be maintained based at least in part on the illuminating, wherein the occupancy count comprises a number of one or more people present in the room. The room may be darkened based at least in part on the occupancy count for the room reaching a pre-determined count.

Darkening the room may comprise dimming an illumination in the room. The room may comprise an at least partially confined room. In some embodiments, the room may be partially illuminated based at least in part on a time of day. In some instances, the room is a bedroom and it may be observed when at least one person occupies the bed. The bedroom may be darkened based at least in part on the observing. A load sensor may detect the presence of the at least one person occupying the bed.

In some embodiments, one or more lasers may detect directional motion of the at least one person. The one or more lasers may be proximate to at least one entry to the room. In some instances, the one or more lasers may be proximate each entry to the room.

In some embodiments, input may be received to darken the room despite the occupancy count being greater than the pre-determined count. In some instances, a pattern of room occupancy may be tracked. When to illuminate the room may be predicted based at least in part on the tracking. The room may be illuminated based at least in part on the predicting. In some instances, the room may be darkened if at least one person does not enter the room within a predetermined time period.

According to another embodiment, an apparatus to illuminate a room is also described. The apparatus may include a processor, a memory in electronic communication with the processor and instructions stored on the memory of the processor. The processor may execute the instructions to identify at least one person entering the room and illuminate the room based at least in part on the identifying. The processor may execute instructions to maintain an occupancy count for the room based at least in part on the illuminating, wherein the occupancy count comprises a number of one or more people present in the room. The processor may execute instructions to darken the room based at least in part on the occupancy count reaching a pre-determined count.

According to another embodiment, a non-transitory computer-readable medium that may store instructions executable by a processor is also described. The instructions may identify at least one person entering the room and illuminate the room based at least in part on the identifying. The instructions may maintain an occupancy count for the room based at least in part on the illuminating, wherein the occupancy count comprises a number of one or more people present in the room. The instructions may darken the room based at least in part on the occupancy count reaching a pre-determined count.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
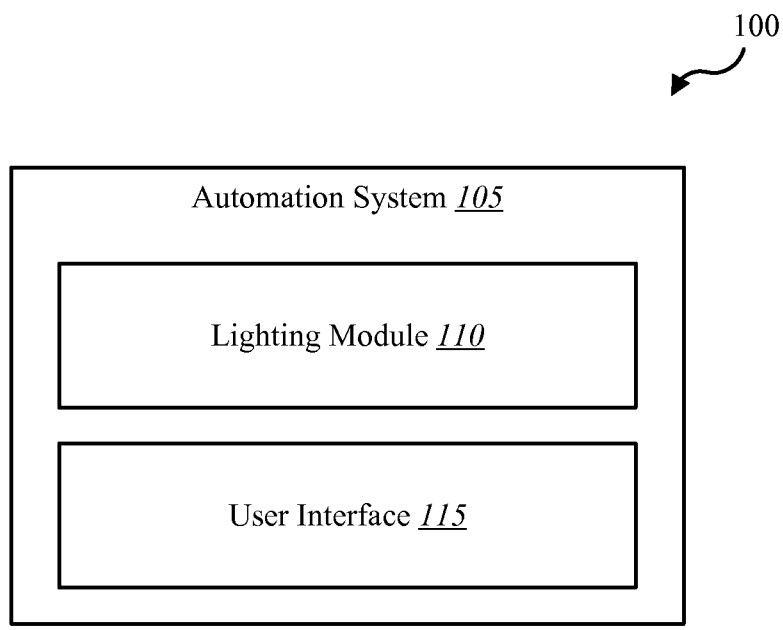
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to controlling illumination in a room. More specifically, the systems and methods described herein relate to controlling illumination of a room based at least in part on the presence of people within the room. Some methods rely upon detecting motion within the room to determine the presence of a person and maintain illumination within a room. While these systems have advantages, if the person remains still for a predetermined period of time, the lights may turn off while the room is still occupied. The motion detector may be inadvertently triggered as well. For example, a pet may set off the lights, wind blowing a curtain may be detected and cause the lights to be turned on.

In some embodiments, a system may smartly detect motion to accurately illuminate or darken a room. A room may comprise an enclosed room with doors, an enclosed room with entryways, partially enclosed rooms, portions of a room and the like. In some instances, a smart motion detection system may be proximate to at least one entry to a room. The smart motion detection system may detect when at least one person enters or exits a room. By detecting the directional movement of the person entering or exiting the room, the smart motion detection system may manage or maintain a number of people in a room at any point. When at least one person is within the confines of a room, the smart motion detection system may, at least partially, illuminate the room.

FIG. 1 is a block diagram illustrating one embodiment of an environment 100 in which the present systems and methods may be implemented. In some embodiments, the systems and methods described herein may be performed at least in part on or using an automation system 105. The environment 100 may include the automation system 105, a lighting module 110, and a user interface 115.

The lighting module 110 may smartly illuminate and darken a room. For example, the lighting module 110 may detect when at least one person enters or exits a room. The lighting module 110 may track a total occupancy count for a room and maintain illumination within a room as long as the total occupancy count satisfies a threshold. For example, illumination may be maintained when the total occupancy count is above a pre-determined count. In some instances, the pre-determined count may be zero. In some embodiments, the lighting module 110 may fully light the room, light parts of the room, or partially illuminate the room based at least in part on several factors. The factors may comprise a time of day, a pre-programmed setting, settings of other systems in the automation system, or the like. In some embodiments, the programming of the lighting module 110 may be overridden. For example, a user may wish for the room to be dark. The user may be having a candlelight dinner, watching a movie, or the like.

The user interface 115 may allow a user and/or administrator to interact with the automation system 105. A user may comprise any person with access to the automation and security system, such as an administrator, a family member, an employee, and the like. The user may have varying levels of access and control over the automation and security system. The user interface 115 may facilitate communication between the user and the automation system 105. For example, in some embodiments, the automation system 105 may include a security system.

Figure 2:
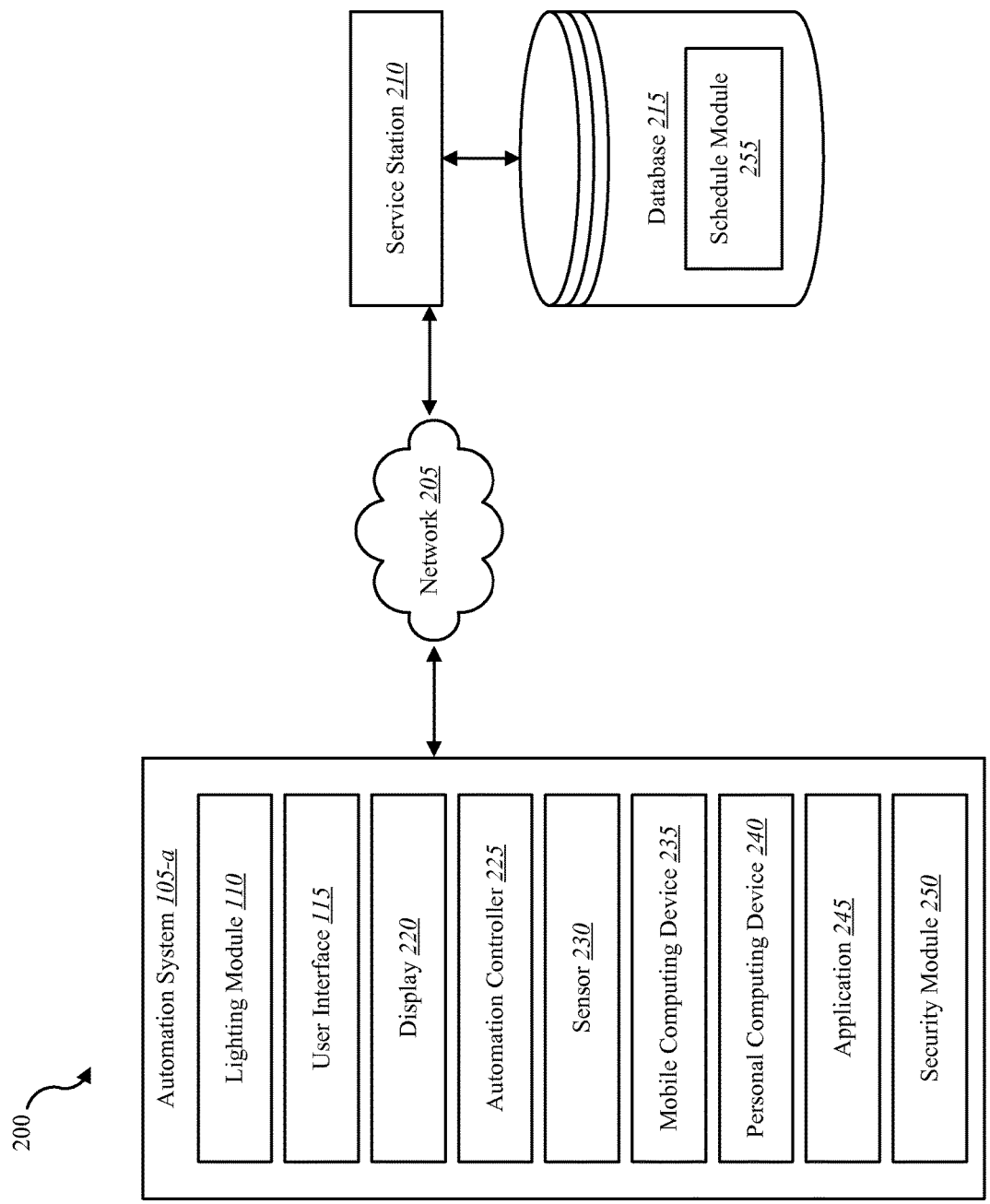
FIG. 2 is a block diagram of another environment in which the present systems and methods may be implemented.

Referring now to FIG. 2, in some embodiments, an environment 200 may include the components of the environment 100 described above, and may further include a network 205, a service station 210, and a database 215. Additionally, the environment 200 may include an automation system 105-a, which may be one example of the automation system 105 described above with reference to FIG. 1. The automation system 105-a may additionally include a display 220, an automation controller 225, a sensor 230, a mobile computing device 235, a personal computing device 240, an application 245, and a security module 250. The automation system 105-a may include various components and functionality that work cooperatively with the lighting module 110 and the user interface 115, and/or may operate independently of the lighting module 110 and the user interface 115.

The sensor 230 shown in FIG. 2 may represent one or more separate sensors or a combination of two or more sensors in a single sensor device. For example, the sensor 230 may represent one or more camera sensors and one or more motion sensors connected to the environment 200. The motion sensor may comprise a smart motion sensor. For example, the motion sensor may comprise one or more lasers capable of detecting directional motion. Additionally, or alternatively, the sensor 230 may represent a combination sensor such as both a camera sensor and a motion sensor integrated in the same sensor device. Although the sensor 230 is depicted as connecting directly to the automation system 105-a, in some embodiments, the sensor 230 may connect to the automation system 105-a over network 205. Additionally, or alternatively, the sensor 230 may be integrated with a home appliance or fixture such as a light bulb fixture. The sensor 230 may include an accelerometer to enable the sensor 230 to detect a movement. The sensor 230 may include a wireless communication device enabling the sensor 230 to send and receive data and/or information to and from one or more devices in the environment 200. Additionally, or alternatively, the sensor 230 may include a GPS sensor to enable tracking a location of the sensor 230. The sensor 230 may include a proximity sensor to enable the sensor 230 to detect a proximity of a person relative to a predetermined distance from a dwelling (e.g., geo-fencing). The sensor 230 may include one or more security detection sensors such as, for example, a glass break sensor, a motion detection sensor, or both. Additionally, or alternatively, the sensor 230 may include a smoke detection sensor, a carbon monoxide sensor, or both. The sensor 230 may include one or more olfactory sensors. In some instances, the sensor 230 may include one or more load sensors which may detect a load or weight applied to the sensor.

In some embodiments, the mobile computing device 235 may include one or more processors, one or more memory devices, and/or a storage device. Examples of the mobile computing device 235 may include mobile phones, smart phones, tablets, personal digital assistants (PDAs), wearable computers, ultra-mobile PCs, etc. Although the mobile computing device 235 is depicted as connecting directly to the automation system 105-a, in some embodiments, the mobile computing device 235 may connect to the automation system 105-a over the network 205. Additionally, the mobile computing device 235 may represent a single mobile computing device or multiple mobile computing devices that may access the automation system 105-*a*.

In some embodiments, the personal computing device 240 may include one or more processors, one or more memory devices, and/or a storage device. Examples of the personal computing device 240 may include a viewing device associated with a media content set top box, satellite set top box, cable set top box, DVRs, personal video recorders (PVRs), mobile computing devices, computers, servers, etc. Although the personal computing device 240 is depicted as connecting directly to the automation system 105-*a*, in some embodiments, the personal computing device 240 may connect to the automation system 105-*a* over the network 205. Additionally, the personal computing device 240 may represent a single mobile computing device or multiple mobile computing devices that may access the automation system 105-*a*.

In some embodiments, a user may access the functions of automation system 105-*a* from either the mobile computing device 235 or the personal computing device 240. For example, in some embodiments, the user may have a user profile associated with the automation system 105-*a* and may access the system via the mobile computing device 235 or the personal computing device 240. In further embodiments, the user may have been granted limited accessibility to the automation system 105-*a* without generating a user profile. The user may access the automation system 105-*a* using their personal computing device 240 and/or mobile computing device 235 without a user profile associated with the automation system 105-*a*. In some embodiments, the mobile computing device 235 and/or the personal computing device 240 may include a mobile application interfacing with one or more functions of the automation system 105-*a*, and the service station 210.

Examples of the automation controller 225 may include a dedicated automation computing device. Examples of a dedicated computing device may include a wall-mounted controller, a remote control, a voice activated controller, and the like. In some embodiments, the automation controller 225 may control aspects of a property as well as receive and display notifications regarding monitored activity of a property.

In some embodiments, the application 245 may allow a user to control (either directly or via automation controller 225) an aspect of the monitored property based on the user accessibility permissions, including security, energy management, locking or unlocking a door, checking the status of a door, locating a person or item, controlling lighting, thermostat, cameras, receiving notification regarding a current status or anomaly associated with a home, office, place of business, and the like. In some configurations, the application 245 may enable the automation system 105-*a* to interface with the automation controller 225 and enable the user interface 115 to display automation, security, and/or user management content on the display 220, the mobile computing device 235 and/or the personal computing device 240. Further, the application 245 may be installed on the mobile computing device 235 and/or on the personal computing device 240 to allow a user to interface with the automation system 105-*a* and the service station 210.

In some embodiments, the automation system 105-*a* may communicate with the service station 210 via the network 205. Examples of the network 205 include cloud networks, local area networks (LAN), wide area networks (WAN), virtual private networks (VPN), wireless networks (using 802.11, for example), and/or cellular networks (using 3G and/or LTE, for example), etc. The network 205 may be a single network, or may include multiple interconnected, overlapping, or coincidental networks. For example, in some embodiments, the network 205 may include multiple networks interconnected to facilitate communication or may include redundant networks. For example, the network 205 may represent a first network (e.g., the Internet) and a second network (e.g., cellular networks).

The service station 210 shown in FIG. 2 may represent one or more separate service stations or a combination service stations. The service station 210 may be a network operations center, a monitoring center, a service station or any similar station in association with the automation system service provider.

In some embodiments, the service station 210 may be coupled to the database 215. The database 215 may include, for example, different illumination tracking for each automation system 105-*a* monitored by the service station 210. For example, the database 215 may include a schedule module 255 which may store and periodically update tracking of room illumination. The data collected in the schedule module 255 may help predict a pattern of room illumination for an automation system 105-*a*. The predictable pattern may cause the lighting module 110 to illuminate a room before a user enters the room. The database 215 may include other information including, for example, historical information about the automation system 105-*a* and other aspects of environment 200, and the like.

Figure 3:
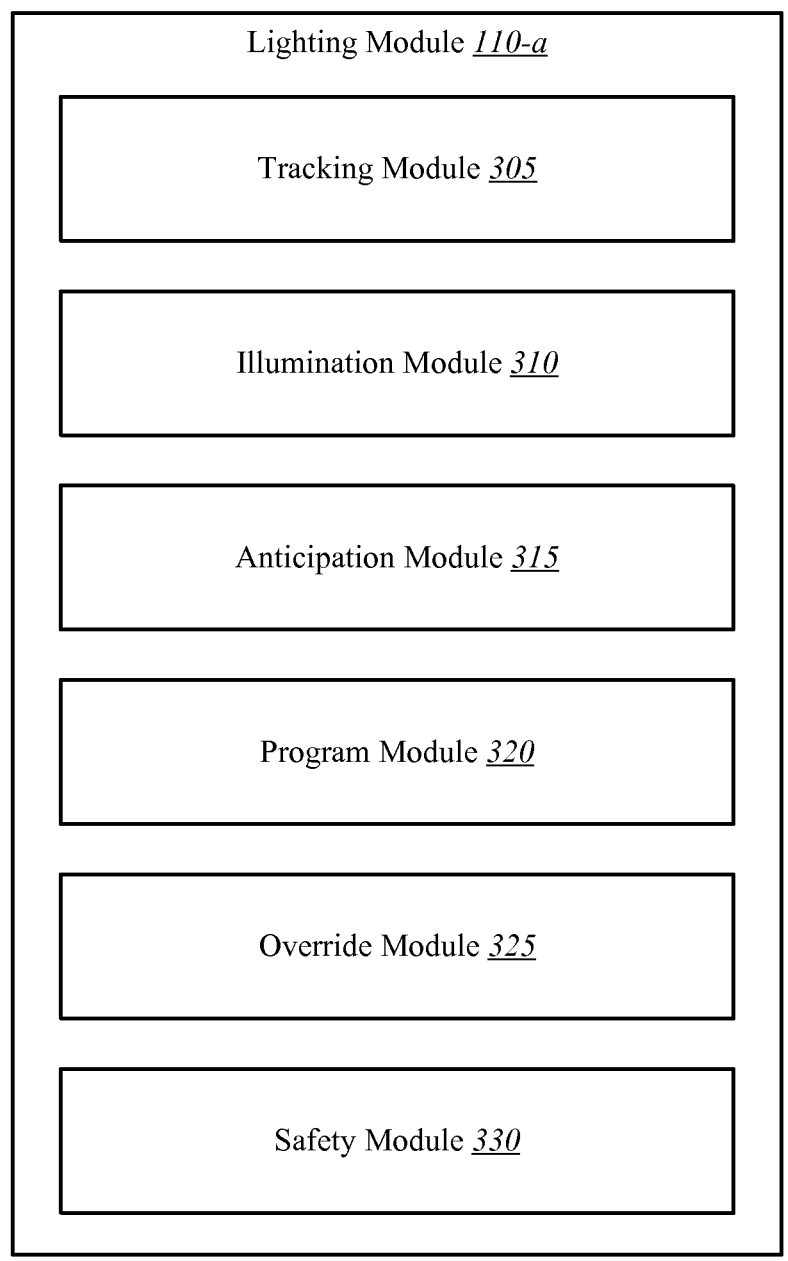
FIG. 3 is a block diagram of an example lighting module of the environments shown in FIGS. 1 and 2.

FIG. 3 is a block diagram 300 illustrating one example of a lighting module 110-*a*. The lighting module 110-*a* may be one example of the lighting module 110 depicted in FIGS. 1 and/or 2. As depicted, the lighting module 110-*a* may include a tracking module 305, an illumination module 310, an anticipation module 315, a program module 320, an override module 325, and a safety module 330. The lighting module 110-*a* may include additional modules and capabilities in other embodiments. Similarly, the lighting module 110-*a* may include fewer number of modules and functionality than that which is described with reference to FIG. 3. The lighting module 110-*a* may illuminate and/or darken a room.

In some embodiments, the tracking module 305 may track the movement of people and may maintain an occupancy count for a room. For example, at least one sensor may be proximate at least one entry way to a room. In some instances, a room may have multiple entryways and a sensor may be proximate each entry way. In some embodiments, the room may be an area of a larger room. The sensors may essentially create a perimeter around the desired area of a room and may trigger possible illumination and or darkening in the apportioned area of the room.

The sensor may be a laser sensor and, in some embodiments, the laser may detect a directional movement. For example, the tracking module 305 may use the sensor to determine if a person is entering or exiting a room. The tracking module 305 may keep track of each person entering or exiting a room and maintain a room occupancy count. The room occupancy count may be any number zero or greater. Each time a person enters the room, the room occupancy count may increase by one, and each time a person leaves the room, the room occupancy count may decrease by one.

The illumination module 310 may illuminate a room based at least in part on information from the tracking module 305. For example, if the room occupancy value is greater than zero, the illumination module 310 may illuminate a room. Illuminating a room may consist of turning on one or more lights. The lights may comprise overhead lighting, flooring lighting, desktop lights, or the like. The illumination module 310 may light all the lights within a room or may only illuminate a few. Additionally, the illumination module 310 may not illuminate the lights at full capacity. For example, the illumination module 310 may dim the lighting in a room.

The number of lights lit and the strength of the illumination may depend at least in part on one or more illumination factors. The illumination factors may comprise a time of day, number of people, size of room, activity in the room, and the like. For example, if a person enters a room late at night after the house has been set to sleep mode, the illumination module 310 may barely illuminate a room so as to not to distress the user's eyes. The user may be getting ready in the morning, or may be getting a midnight snack or drink. If the user is getting ready in the morning, the illumination module 310 may gradually increase the illumination in the room. The illumination module 310 may increase the number of lights lit or may increase the illumination capacity of the lights. Additionally, as a user prepares for bed, the illumination module 310 may gradually dim the lights to prepare the user for bed. Dimming the lights may aid the user in entering a more relaxed state.

The illumination module 310 may also darken a room. For example, if a room occupancy count is at least one and lighting is illuminated, the illumination module 310 may darken the room upon the room occupancy count reaching a pre-determined count. Darkening the room may comprise turning off all lighting in the room, turning off some lighting in a room, or dimming the lighting in a room to a lower brightness.

The illumination module 310 may darken a room based at least in part on several darkening factors. The darkening factors may comprise a time of day, room occupancy count, activity, and the like. For example, if room occupancy count is at least one but the television is turned on, the illumination module 310 may darken the room, dim the lighting, or shut off the lights to achieve an optimal illumination level for increase viewing pleasure. Additionally, if a user has turned on a fireplace, the illumination module 310 may darken or adjust the lighting for optimal fireplace pleasure. In other embodiments, a user may be cooking and/or preparing dinner and may be traversing frequently between the kitchen and a dining room. The user may be the only person in each room at the time but turning the lights on and off as the user goes between the two rooms may become frustrating and/or distracting. Therefore, the illumination module 310 may detect the time and activity in the kitchen and dining room and implement a motion time out for darkening a room. For example, the illumination module 310 may switch the darkening factor from a room occupancy to a predetermined time period of the room occupancy reaching a pre-determined count. For example, the illumination module 310 may not darken the kitchen until approximately five minutes after the room occupancy has reached the pre-determined count. This may prevent the kitchen lights from turning off prematurely and bothering the user.

The anticipation module 315 may anticipate and preemptively turn lights on in a room. For example, the anticipation module 315 may record the illumination timing and length for each room. The anticipation module 315 may predict a pattern for the user and attempt to preemptively schedule when to turn lights on. For example, a user may enter a kitchen of a home at approximately 7 AM every morning to make breakfast and prepare for the day. The anticipation module 315 may track this behavior and prior to 7 AM. Additionally, if a store opens at a certain time in the morning, the anticipation module 315 may turn the lights on prior to the user's arrival. If the user does not enter the room within a predetermined time frame after the room has been illuminated, then the illumination module 310 may darken the room.

The program module 320 may be programmed in combination with the illumination module 310 to illuminate and darken a room upon a user's schedule. The user may require a schedule for multiple reasons. For example, the user may be traveling and out of town for an extended period of time. The user may wish for the house to appear occupied despite an absence. Therefore, the user may program lights in different rooms to illuminate and have the appearance of a person being in the home. In another embodiment, the user may set the program module 320 simply to away. The program module 320 may then work in conjunction with the anticipation module 315 and program different lights within the home to illuminate based upon the user's typical activities. This may reinforce the appearance of the user being present in the home. In another embodiment, the user may set program different rooms to illuminate or darken upon their requested schedule. For example, the user may wish for all internal lights to darken at a predetermined time and for various nightlights throughout a home to illuminate at a predetermined time.

Additionally, in a business setting, the lighting may be programmed in the different rooms according to business needs. For example, the lighting may be programmed to illuminate and darken upon business hours or employee working hours. If the business is a greenhouse, lighting in the greenhouse room may be scheduled to turn on and off at predetermined time for optimum growing.

The override module 325 may allow other modules to be overridden. For example, the override module 325 may receive input independent from the other modules to either illuminate or darken a room. The override module 325 may receive tactile input in terms of a user providing manual input to a switch to either illuminate or darken a room. In other instances, a user may remotely control the illumination with a control panel as part of the automation system. The control panel may be a mounted control panel within the automation system or may be a remote control panel such as a user's mobile phone. A user may wish to override programming for several reasons. In some embodiments, the override module 325 may respond to alternative sensors. For example, in a bedroom, a bed may comprise one or more load sensors. If the load sensors sense a load, the override module 325 may darken the room based on the user's presence in the bed.

A safety module 330 may illuminate or darken a room for various safety concerns. For example, the safety module 330 may receive an anomaly alert within the automation system. The anomaly alert may be an unauthorized entry or other unauthorized motion associated with a household, business, or other location. The safety module 330 may illuminate one or more rooms in an attempt to thwart unauthorized entry, alert a user of the unauthorized entry, or illuminate a room where an unauthorized entry or motion occurred. For example, if an automation system detects an attempt or actual unauthorized entry, the safety module 330 may begin illuminating portions of the house in an attempt to scare or alert the anticipated intruder. For example, if an intruder is attempting an unauthorized entry in one room, the safety module 330 may illuminate the adjacent room in an attempt to thwart the intruder's motives to enter the home or business location. Illuminating the adjacent room may cause the intruder or attempted intruder to believe a person is about to enter their location and cause the intruder to abandon their attempts at trespassing and perhaps burglary or other related crime.

Figure 4:
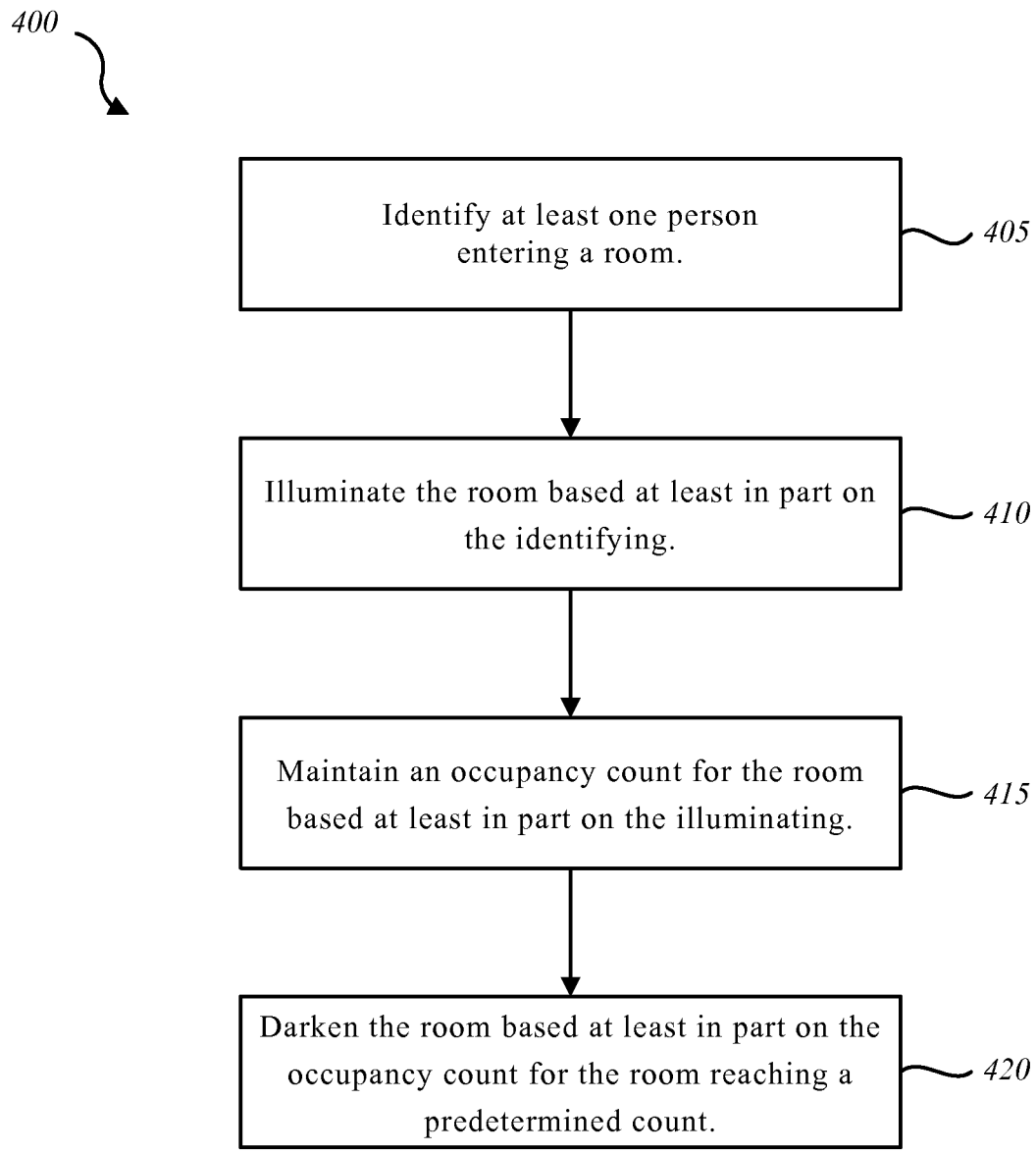
FIG. 4 is a flow diagram illustrating an exemplary method for controlling illumination in a room.

FIG. 4 is a flow diagram illustrating one embodiment of a method 400 for illuminating a room. In some configurations, the method 400 may be implemented in whole or in part by the lighting module 110 of the automation system 105 shown in FIGS. 1 and/or 2. In further embodiments, the method 400 may be performed generally by the automation system 105 shown in FIGS. 1 and/or 2, or even more generally by the environments 100, 200 shown in FIGS. 1 and/or 2.

At block 405, at least one person entering a room may be identified. For example, an entry to a room may be equipped with one or more sensors. The entry to the room may comprise a door, passageway, or the like. The sensors may comprise motion sensors. The motion sensors may detect directional motion. Therefore, the directional motion sensors may determine when a person passing through an entry way is entering or exiting a room. In some embodiments, multiple people may enter or exit a room. The sensor may differentiate between the different people and may discern a number of people entering or exiting the room.

In further embodiments, the room may not be an enclosed space but may be a portion of a larger room. The sensors may form a type of perimeter around the portioned space to determine when at least one person enters the portioned space.

At block 410, the room may be illuminated based at least in part on the identifying. For example, when a room occupancy is greater than a predetermined number, the lights in the room may illuminate. Illuminating the lights may comprise illuminating all lights within a room, a select number of lights, illuminating the lights at a diminished capacity, and the like. The lights may continue to be illuminated as long as the occupancy count for the room is greater than the predetermined count. In some embodiments, the predetermined count may be equivalent to zero.

At block 415, an occupancy count for the room may be maintained based at least in part on the illuminating. The occupancy count may comprise a number of one or more people. The occupancy count may change throughout an occupancy of the room but the occupancy count may maintain the count as it changes. For example, as people enter or exit the room, the occupancy count will fluctuate up or down until eventually it reaches the predetermined count, or zero as all occupants exit the room.

At block 420, the room may darken upon the occupancy count for the room reaching a predetermined count. For example, as the occupancy count fluctuates with room occupancy, eventually the room occupancy count may reach a predetermined count wherein the room is programmed to darken. In some embodiments, the predetermined count may be equivalent to zero. When the room occupancy count reaches the predetermined count, or the room is empty, the room may darken. Darkening the room may comprise shutting off all lighting to the room, shutting select lights within a room, reducing the illumination capacity (dimming) the lights in the room, or the like.

Figure 5:
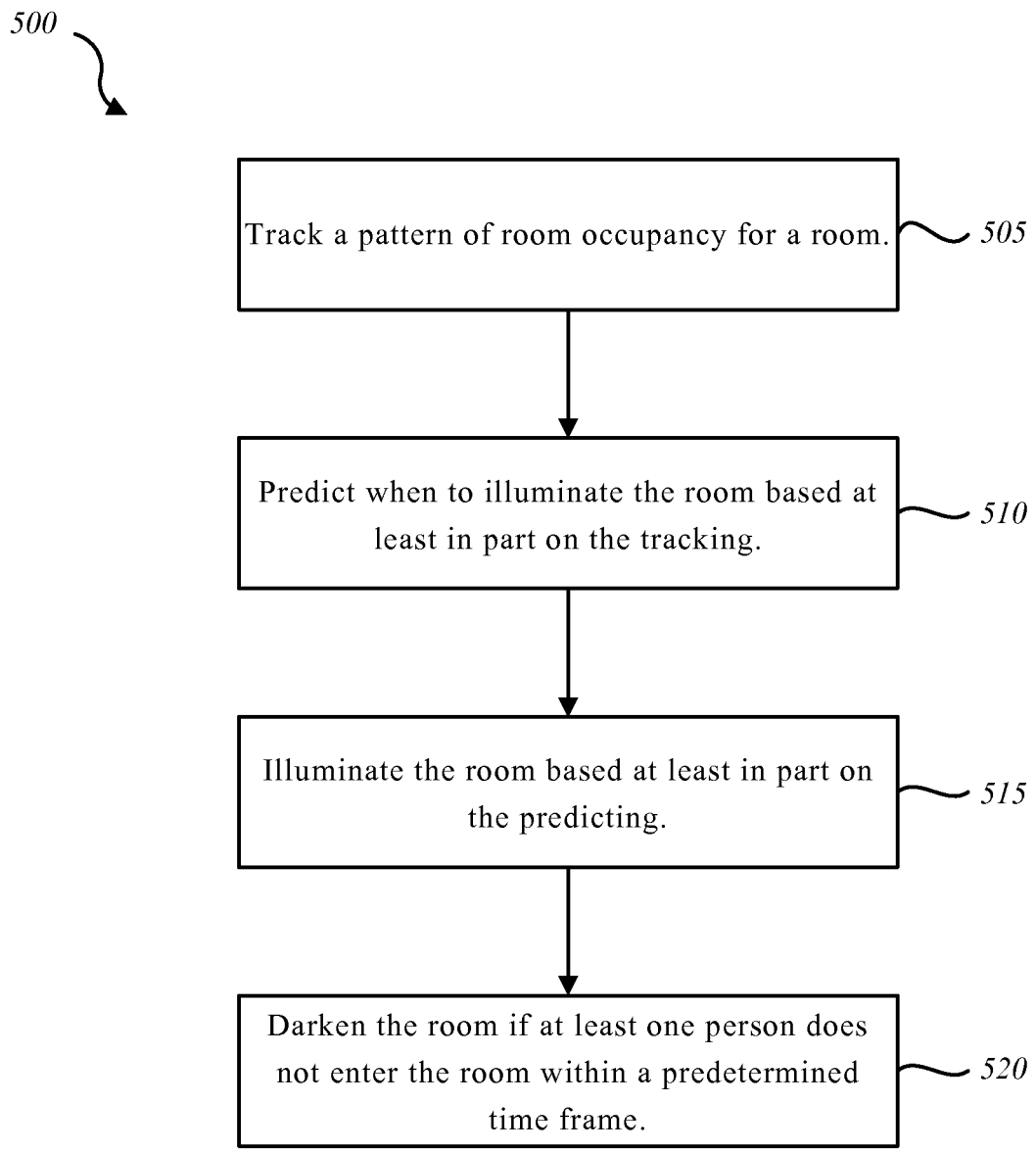
FIG. 5 is a flow diagram illustrating another exemplary method for controlling illumination in a room

FIG. 5 is a flow diagram illustrating one embodiment of a method 500 for illuminating a room. In some configurations, the method 500 may be implemented in whole or in part by the lighting module 110 of the automation system 105 shown in FIGS. 1 and/or 2. In further embodiments, the method 500 may be performed generally by the automation system 105 shown in FIGS. 1 and/or 2, or even more generally by the environments 100, 200 shown in FIGS. 1 and/or 2.

At block 505, a pattern of room occupancy may be tracked. For example, the approximate time a user typically enters or exits a room may be tracked. The approximate length of time a user occupies a room may be tracked. Additionally, when a user sets the lights to off may additionally be tracked and recorded. The pattern of usage may comprise illuminating a bedroom in the morning, or maintaining illumination in the kitchen and/or dining room. Each day of the week may comprise different usage patterns. For example, a user and/or users may observe different habits based at least in part on the day of the week. A Monday schedule may differ from a Tuesday schedule and the like.

The pattern of illumination throughout a commercial building may also be tracked and recorded. For example, when a person typically arrives to open a storefront may be tracked and recorded. The approximate time and length of time a break room, or storage room is utilized may additionally be tracked and recorded.

At block 510, when to illuminate a room may be predicted based at least in part on the tracking. For example, a pattern of room usage and/or illumination may occur. A user may rise in the morning and turn on lights at approximately the same time every day. The user may watch television or a movie at approximately the same time every day. A user may open a business at approximately the same time every day. Any pattern of room and/or illumination may be predicted. For example, a cumulative amount of data may reveal specific user behavioral patterns.

At block 515, the room may be illuminated based at least in part on the predicting. For example, the predictions may anticipate a user's typical behavioral patterns and room usage. At block 515, using those predictions, a room may be illuminated. However, at block 520, the room may be darkened if at least one user does not enter the room within a predetermined time frame. For example, a kitchen may be illuminated at 5:30 AM on a Monday. If a user does not enter the kitchen by 5:45 AM, the room may be darkened. In some embodiments, if the method 500 is linked to an automation system, the automation system may predict movement. For example, the automation system may detect that a user of a home automation system was up later than usual the night before. In those instance, the room illumination may be turned off for the following morning to adapt to the user's atypical activity. Additionally, the automation system may be linked to a user's calendar and may alter the pattern of illumination based at least in part on an event on the user's calendar. For example, if a user is typically at home on a Friday evening and utilizes the living room at approximately 7 pm, the automation system may not illuminate the living room if the user's calendar lists an event elsewhere. Similarly, a business may have a calendar event such as a holiday or special hours listed. The automation system may automatically adjust its illumination pattern based at least in part on the calendar events.

Figure 6:
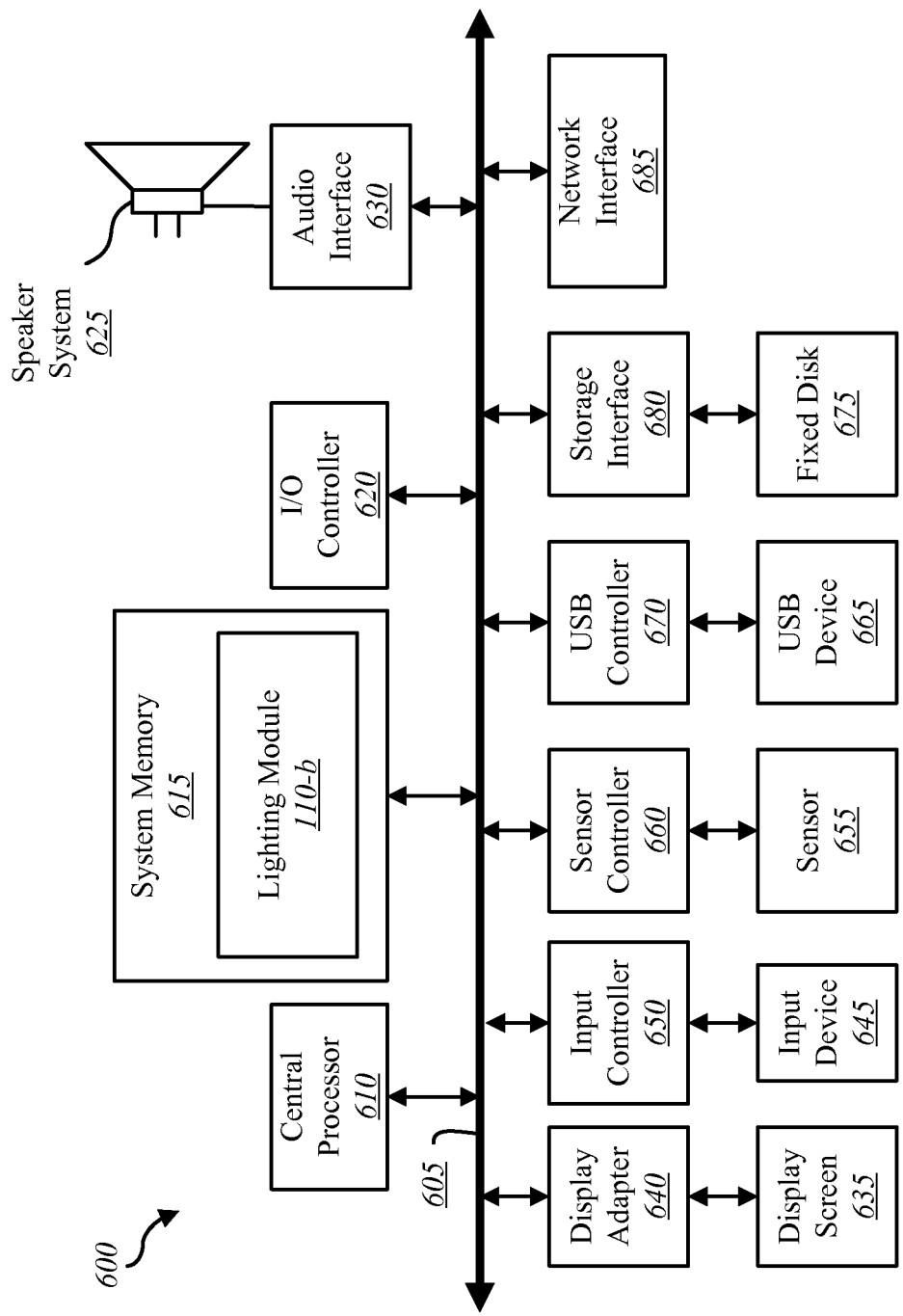
FIG. 6 is a block diagram of a computer system suitable for implementing the present systems and methods of FIGS. 1-4.

FIG. 6 depicts a block diagram of a controller 600 suitable for implementing the present systems and methods. In one configuration, the controller 600 may include a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can include, among other code, the Basic Input-Output system (BIOS) which controls basic hardware operation such as the interaction with peripheral components or devices. For example, a lighting module 110-b to implement the present systems and methods may be stored within the system memory 615. The lighting module 110-b may be an example of the lighting module 110 illustrated in FIGS. 1, 2, and/or 3. Applications (e.g., application 245) resident with controller 600 are generally stored on and accessed via a non-transitory computer readable medium, such as a hard disk drive (e.g., fixed disk drive 675) or other storage medium. Additionally, applications can be in the form of electronic signals modulated in accordance with the application and data communication technology when accessed via the network interface 685.

Storage interface 680, as with the other storage interfaces of controller 600, can connect to a standard computer readable medium for storage and/or retrieval of information, such as a fixed disk drive 675. The fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS® ANDROID®, MS-DOS®, MS-WINDOWS®, OS/2® UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method to illuminate a room, comprising:
   detecting, by an automation system, at least one person entering the room;
   tracking, by the automation system, a pattern of room occupancy for the room based at least in part on the detecting;
   predicting, by the automation system, when to illuminate the room based at least in part on the tracking;
   illuminating, by the automation system, the room based at least in part on the predicting;
   maintaining, by the automation system, an occupancy count for the room based at least in part on the illuminating, wherein the occupancy count comprises a number of one or more people present in the room;
   receiving, by the automation system, appliance data from an appliance monitor indicating that the at least one person has activated an appliance;
   receiving, by the automation system, visual data indicating one or more activities occurring in the room from a camera of the automation system positioned in the room;
   identifying, by the automation system, an interaction between the at least one person and the appliance based at least in part on the appliance data and the visual data;
   determining, by the automation system, a darkening time period for an overhead light, a floor light, a lamp, or a combination thereof based on the identified interaction; and
   darkening, by the automation system, the overhead light, the floor light, the lamp, or the combination thereof in the room and after expiration of the determined darkening time period, while the at least one person is in the room based at least in part on the occupancy count for the room satisfying a pre-determined count and the identified interaction with the appliance.

2. The computer-implemented method of claim 1, wherein the overhead light, the floor light, and the lamp darkened by the automation system based at least in part on the identified interaction with the appliance are not part of the appliance.

3. The computer-implemented method of claim 1, wherein the room is an at least partially confined room.

4. The computer-implemented method of claim 1, further comprising:
   partially illuminating the room based at least in part on a time of day.

5. The computer-implemented method of claim 1, wherein the room is a bedroom and further comprising:
   observing when the at least one person occupies a bed;
   darkening the bedroom based at least in part on the observing.

6. The computer-implemented method of claim 5, wherein a load sensor detects the presence of the at least one person in the bed occupying the bed.

7. The computer-implemented method of claim 1, wherein one or more lasers detects directional motion of the at least one person.

8. The computer-implemented method of claim 7, wherein the one or more lasers are proximate to at least one entry to the room.

9. The computer-implemented method of claim 8, wherein the one or more lasers are proximate each entry to the room.

10. The computer-implemented method of claim 1, further comprising:
    receiving input to darken the room despite the occupancy count being greater than the predetermined count.

11. The computer-implemented method of claim 1, further comprising:
    predicting, by the automation system, a schedule for the at least one person that includes a predicted time of day the at least one person will enter the room based at least in part on the tracking, wherein predicting when to illuminate the room is based at least in part on predicting the schedule for the at least one person; and
    illuminating, by the automation system, the room at the predicted time of day indicated in the schedule of the at least one person based at least in part on the predicting.

12. The computer-implemented method of claim 1, further comprising:
    darkening the room if the at least one person does not enter the room within a predetermined time frame.

13. The computer-implemented method of claim 11, wherein the automation system gradually increases the illumination of the lighting when illuminating the room at the predicted time of day being in the morning.

14. The computer-implemented method of claim 1, further comprising:
    initiating, by the automation system, a schedule for illuminating and darkening the room while the at least one person is away from a building associated with the room; and
    programming lights in the room to illuminate and darken based at least in part on the at least one person's activities when the at least in one person is present in the building, wherein adjusting the illumination of the room is based at least in part on programming the lights based at least in part on the at least on person's activities.

15. An automation system to illuminate a room comprising:
    a processor;
    a memory in electronic communication with the processor; and
    instructions stored in the memory, the instructions being executable by the processor to:
    detect at least one person entering the room;
    track a pattern of room occupancy for the room based at least in part on the detecting;
    predict when to illuminate the room based at least in part on the tracking;
    illuminate the room based at least in part on the detecting;
    maintain an occupancy count for the room based at least in part on the illuminating, wherein the occupancy count comprises a number of one or more people present in the room;
    receive appliance data from an appliance monitor indicating that the at least one person has activated an appliance;
    receive visual data indicating one or more activities occurring in the room from a camera of the automation system positioned in the room;
    identify an interaction between the at least one person and the appliance based at least in part on the appliance data and the visual data;

determine a darkening time period for an overhead light, a floor light, a lamp, or a combination thereof based on the identified interaction; and darken the overhead light, the floor light, the lamp, or the combination thereof in the room and after expiration of the determined darkening time period, while the at least one person is in the room based at least in part on the occupancy count for the room satisfying a pre-determined count and the identified interaction with the appliance.

16. The automation system of claim 15, wherein adjusting the illumination of the room comprises dimming an illumination in the room.

17. The automation system of claim 15, wherein the instructions are executable by the processor to:

partially illuminate the room based at least in part on a time of day.

18. A non-transitory computer-readable medium storing instructions executable by a processor to:

detect, by an automation system, at least one person entering a room;

track a pattern of room occupancy for the room based at least in part on the detecting;

predict, by the automation system, when to illuminate the room based at least in part on the tracking;

illuminate, by the automation system, the room based at least in part on the detecting;

maintain, by the automation system, an occupancy count for the room based at least in part on the illuminating, wherein the occupancy count comprises a number of one or more people present in the room;

receive, by the automation system, appliance data from an appliance monitor indicating that the at least one person has activated an appliance;

receive, by the automation system, visual data indicating one or more activities occurring in the room from a camera of the automation system positioned in the room;

identify, by the automation system, an interaction between the at least one person and the appliance based at least in part on the appliance data and the visual data;

determine, by the automation system, a darkening time period for an overhead light, a floor light, a lamp, or a combination thereof based on the identified interaction; and darken, by the automation system, the overhead light, the floor light, the lamp, or the combination thereof in the room and after expiration of the determined darkening time period, while the at least one person is in the room based at least in part on the occupancy count for the room satisfying a pre-determined count and the identified interaction with the appliance.

19. The computer-readable medium of claim 18, wherein the instructions are executable by the processor to:

partially illuminate the room based at least in part on a time of day.

20. The computer-readable medium of claim 18, wherein the instructions are executable by the processor to:

darken the room if the at least one person does not enter the room within a predetermined time frame.

* * * * *